United States Patent
Bader

(10) Patent No.: US 7,234,376 B2
(45) Date of Patent: Jun. 26, 2007

(54) HOLDING DEVICE FOR A FASTENING ELEMENT

(75) Inventor: Thomas Bader, Landsberg (DE)

(73) Assignee: Hilti Aktiengesellschaft, Schaan (LI)

( * ) Notice: Subject to any disclaimer, the term of this patent is extended or adjusted under 35 U.S.C. 154(b) by 219 days.

(21) Appl. No.: 10/789,120

(22) Filed: Feb. 27, 2004

(65) Prior Publication Data

US 2004/0226410 A1 Nov. 18, 2004

(30) Foreign Application Priority Data

Feb. 28, 2003 (GB) .............................. 10309133.5

(51) Int. Cl.
*B25B 13/48* (2006.01)

(52) U.S. Cl. .................. 81/55; 81/13; 81/455; 269/233

(58) Field of Classification Search ..................... 81/55, 81/13, 90.2, 90.6, 91.3, 111–117, 453–455, 81/57.37; 269/196, 229, 230, 271, 233; 279/106, 279/107; 408/240

See application file for complete search history.

(56) References Cited

U.S. PATENT DOCUMENTS

| | | | | |
|---|---|---|---|---|
| 307,252 A | * | 10/1884 | Armstrong | .................. 81/114 |
| 1,623,379 A | * | 4/1927 | Beaver | .......................... 81/112 |
| 2,205,167 A | * | 6/1940 | Greterman | ................... 81/455 |
| 2,704,003 A | * | 3/1955 | Stevens | ........................ 81/112 |
| 3,547,169 A | * | 12/1970 | Bangerter | .................. 81/57.42 |
| 3,965,950 A | * | 6/1976 | MacDonald | ................. 81/455 |
| 3,998,467 A | * | 12/1976 | Petkovich | .................... 279/107 |
| 4,003,417 A | * | 1/1977 | Cornwell | .................... 81/57.37 |
| 6,062,574 A | * | 5/2000 | Yorde | ......................... 408/240 |
| 6,305,697 B1 | * | 10/2001 | Tebbe | ........................ 279/107 |
| 6,458,022 B1 | * | 10/2002 | Folz | ........................... 269/196 |

FOREIGN PATENT DOCUMENTS

GB 2411373 A * 8/2005

* cited by examiner

*Primary Examiner*—Hadi Shakeri
(74) *Attorney, Agent, or Firm*—Abelman, Frayne & Schwab

(57) ABSTRACT

A holding device for fastening elements which is securable to screw-driving power tool and includes at least two clamping members (20) which abut a stem (74) of the fastening element in a release position of the clamping members and which are displaceable upon an application of a force thereto into their release position, with the clamping members (20) having at least one contact region which forms, at least in the support position of the clamping members (20), a front stop of the holding device (10) in a drive-in direction (22) of the power tool (2).

17 Claims, 6 Drawing Sheets

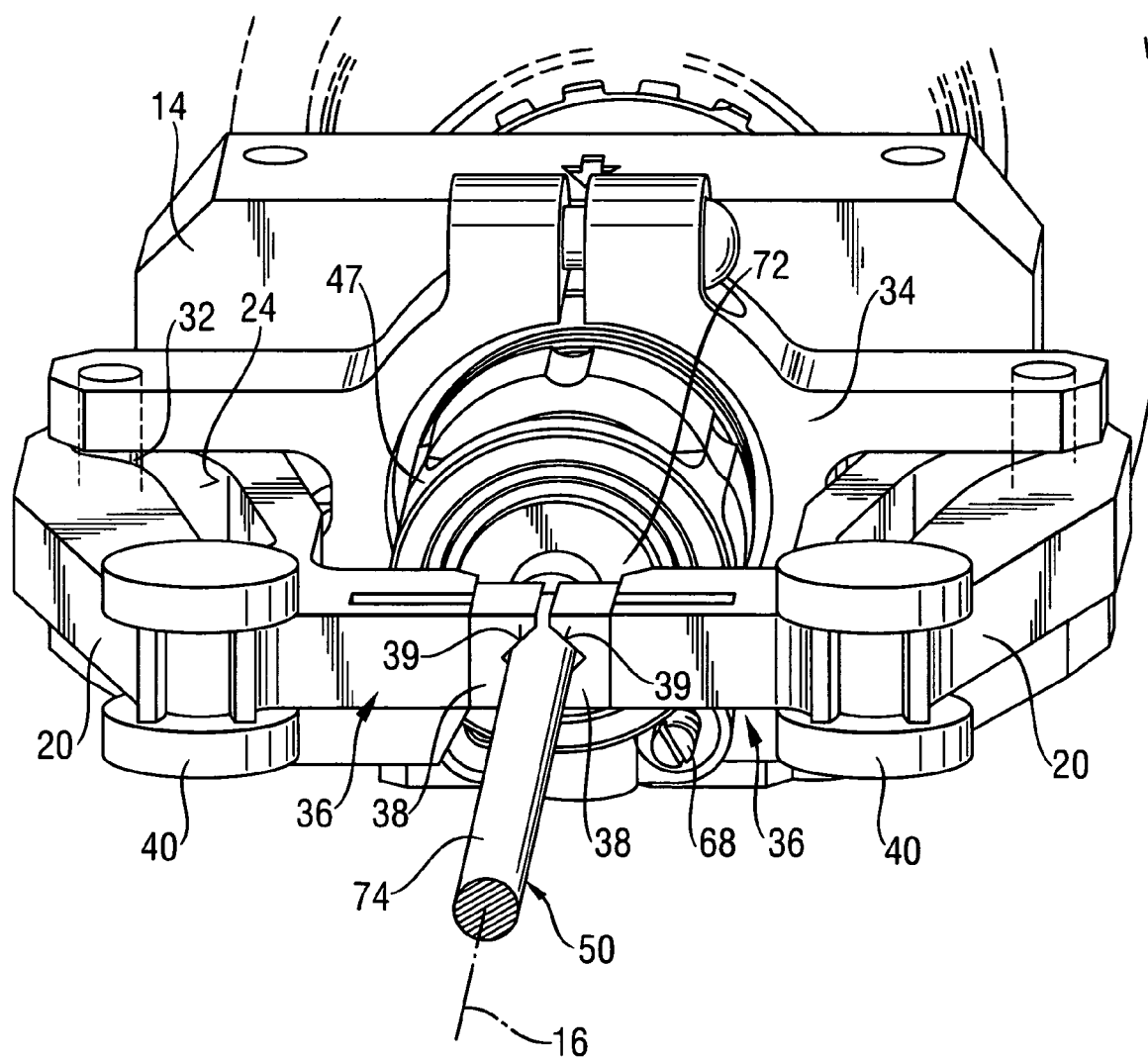

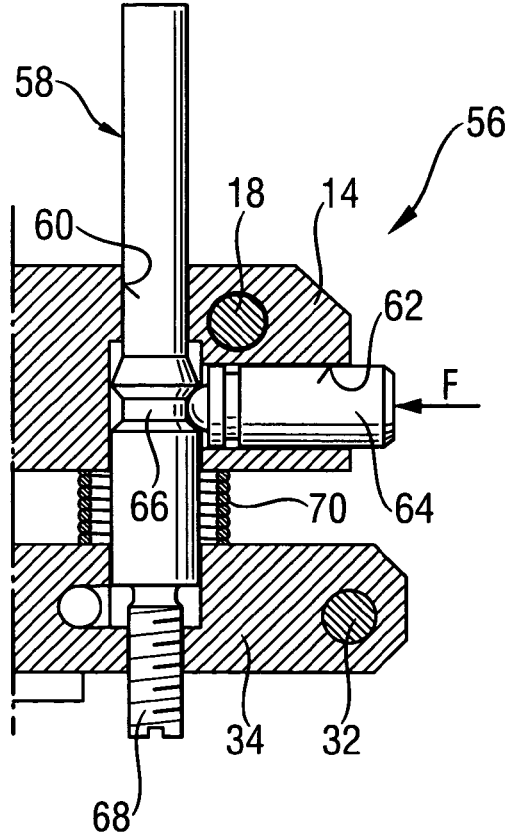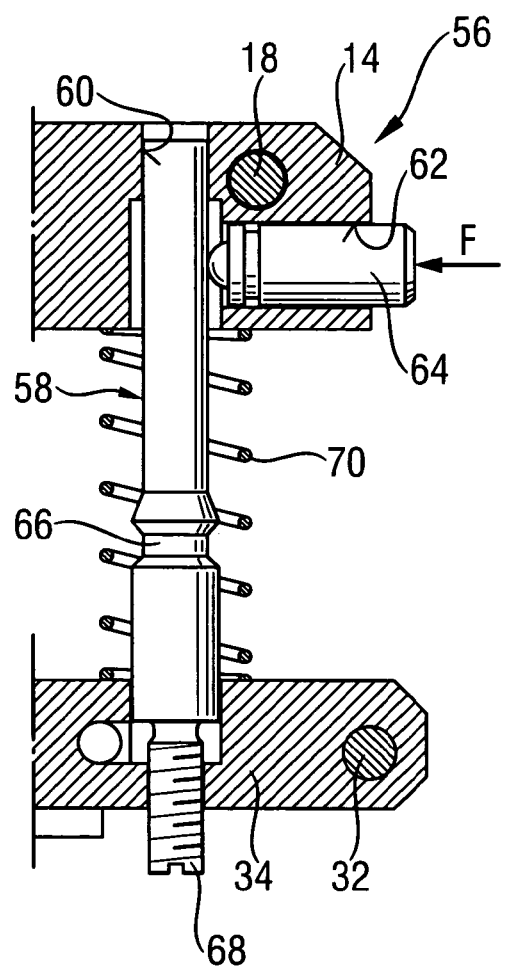

HOLDING DEVICE FOR A FASTENING ELEMENT

BACKGROUND OF THE INVENTION

1. Field of the Invention

The present invention relates to a device securable on a screw-driving power tool for holding and supporting a fastening element insertable in a tool bit of the power tool, with the holding device including at least two clamping members which abut a stem of the fastening element in a support position of the clamping members and which are displaceable upon an application of a force thereto into their release position.

2. Description of the Prior Art

Holding devices of the type described above provide for an automatic retention of fastening elements in a screw-driving power tool and, thereby, noticeably facilitate the driving-in process. Because the holding devices support screws radially and, thereby, prevent wobbling of the screws and the resulting damage of the surfaces the screws are driven through, the holding devices are particularly advantageous for securing elongate self-drilling screws to sensitive surfaces, e.g., lacquered sheet metal of sandwich elements such as used in, e.g., shop-window constructions and in sheet metal roofs. In addition, the use of a holding device permits to dispense with a time-consuming, preliminary boring in many cases. In summary, holding devices permit to simplify the screw-in process and to prevent damage of constructional components and workpieces.

German Publication DE-4037547 discloses a device for holding screws that are secured in a screw-driving power tool with a sleeve-shaped component. A likewise sleeve-shaped support part is telescopically displaced over the sleeve-shaped component and carries two clamping members rotatable about respective pins. The clamping members are formed as holding jaws and extend, in the off-position, transverse to the inner wall, projecting inwardly therefrom, with the free ends of the holding jaws supporting the stem of a fastening element. Upon the screw being driven in, the front side of the support part, which faces the operational or drive-in direction, abuts the workpiece in which the screw is being driven. Upon continuation of the screw-in process, the support part is displaced by the counter-pressure of the workpiece relative to the sleeve-shaped component and relative to the screw. With the displacement of the support part relative to the screw, the screw head passes past the holding jaws, pivoting them in the direction of the workpiece and out of the drive-in path of the screw.

In order to insure that the screw can be driven into the workpiece up to a stop, it is necessary that the holding jaws be displaced, in the drive-in direction, completely behind the end surface of the tool bit of the screw-driving tool. The drawback of the foregoing procedure consists in that, among others, the displacement length of the support part relative to the sleeve-shaped component should correspond to the length of the holding jaws. As a result, it is necessary to use a special extension for connecting the spindle of the drive-in tool with the tool bit or to produce a special, elongate tool bit. Both solutions are associated with additional manufacturing costs.

Moreover, the known solution cannot be used for driving-in screws with large head or large plain or sealing washer. In this case, particularly long holding jaws should be used which, in turn, would require a particularly long displacement length and, therefore, a particularly unwieldy length of the holding device. Moreover, the production of such long holding jaws is relatively expensive, as they should insure an adequate stability during the support of the screw.

A further drawback of the known device follows from the sleeve-shaped construction of the components which provide a very limited view of a screw. Moreover, the components have a relatively large weight which, with the arrangement of the device at the front end of the screw-driving tool, leads to an unfavorable weight distribution and, as a result, to a poor handling of the screw-driving tool. In particularly, during the driving-in of the screw in a facade, a poor balance of a screw-driving tool is a hindrance.

Accordingly, an object of the present invention is to provide a holding device for screws in which the foregoing drawbacks are eliminated.

Another object of the present invention is to provide a holding device for screws having a simpler construction resulting from a reduced length of the holding device.

SUMMARY OF THE INVENTION

These and other objects of the present invention, which will become apparent hereinafter, are achieved by providing a holding device the clamping members of which have at least one contact region which forms, at least in the support position of the clamping members, a front stop of the holding device in the drive-in direction of the screw-driving tool.

With the stop being formed by the clamping members themselves, they themselves engage the workpiece into which a fastening element is being driven. As a result, the force for displacing the clamping members to their release position is applied by the workpiece directly to the clamping members. As a result, the length of the holding device is reduced. In addition, with the workpiece applying the displacement force directly to the clamping members, a reliable and timely actuation of the clamping members is insured.

Advantageously, the at least one contact region is formed by at least one roll. With a roll, on one hand, a substantially friction-free radial displacement of the clamping members over the workpiece surface relative to the drive-in axis becomes possible. This reduces the amount of force necessary for displacing the clamping members. On the other hand, scratches or similar damage of the workpiece is prevented, in particularly, when at least the outer surface of the roll is formed of a soft material such as rubber or soft plastics.

Advantageously, the roll has a spherical shape. This prevents that the roll, in particular, upon a sharp displacement of the holding device over the workpiece surface, would produce, with the roll edges, indented tracks.

Advantageously, the clamping members are formed each by a clamping arm supported by a pivot support displaceable relative to a driving gear of the power tool and by a slotted crank guide. With such a support of clamping arms, it is possible to so displace the clamping members that they are displaced radially outwardly with respect to the drive-in path of a driven-in screw, on one hand, and, on the other hand, are displaced axially behind an end surface of the tool bit facing in the drive-in direction. Both radial and axial displacement components are carried out with a monotonous movement of the clamping members, which permits to substantially simplify the entire construction of the holding device. In addition, by forming the clamping members as clamping arms, a relatively filigree construction is obtained which has a smaller weight and provides for a good visibility of a fastening element.

According to a particularly advantageous embodiment of the present invention, the slotted crank guide has at least one curved guide recess, e.g., in form of an elongate opening or groove formed in the clamping member and into which a guide member, which is fixedly connected with the driving gear of the screw-driving tool without a possibility of displacement relative thereto, projects. Such an arrangement insures a precise and stable displacement of the clamping members between their support position and their release position along a curved path.

Advantageously, the curved guide recess has, toward its first end, in which the guide member is arranged in the support position of the clamping members, a strongly curved section. With this strongly curved section of the slotted crank guide in the region corresponding to the support position, a particularly rapid and wide opening of the clamping members is achieved. In this way, a particularly short length of the holding device becomes possible.

Advantageously, the first end is formed by a straight end section that extends substantially parallel to a drive-in direction of the power tool in the support position of the clamping members. This insures a reliable locking of the clamping members during the screw-in process until the contact region abuts the respective workpiece. In this way, an inadvertent opening of the holding device, e.g., as a result of vibrations, which are produced during the screw-in process, is prevented.

Preferably, the curved guide recess has toward its second end, in which the guide member is arranged in the release position of the clamping members, a straight section. The straight sections insure that the clamping members, after opening, are displaced behind the end surface of the tool bit along as straight as possible path. Thereby, the screw can be screwed in the workpiece up to the stop.

Advantageously, the at least one contact region of the clamping members is arranged in a longitudinal direction of the straight section, i.e., it is arranged at a fictitious extension of the straight section. Such an arrangement prevents appearance of transverse forces in the clamping members, which makes possible formation of slim clamping members.

According to a particularly advantageous embodiment of the present invention, the holding device includes a locking device. The locking device permits to lock the clamping members in a predetermined locking position. In order to release the lock, a small additional force in form of a pressure applied by the workpiece to the clamping members is necessary. With the locking device, a precise position of the clamping members in their support position can be predetermined. In addition, an inadvertent opening of the clamping members is prevented.

It is particularly advantageous when the predetermined locking position of the locking device is adjustable. By adjusting the locking position of the locking device, it is possible to adjust the position of the clamping members in their support position to different stem diameters of driving-in fastening elements.

Advantageously, the locking device includes a lock member securable in different positions relative to the driving gear of the power tool and along which a displacement member for supporting the displaceable pivot supports of the clamping members is displaceable relative to the driving gear. The lock member has a recess. The locking device further includes a locking member displaceably arranged in the displacement member and engageable in the recess formed in the lock member in the support position of the clamping members. The locking members are preloaded against the lock member for locking the clamping members in the release position. This permits to provide a simple and a cost-effective construction of an adjustable locking device.

Advantageously, the clamping members are preloaded in their release position. This provides for an automatic displacement of the clamping members in to their release position, with the contact region of the clamping members being displaced behind the front end surface of the tool bit, upon release of the locking position of the locking device. This prevents an unnecessary contact between the clamping members and the workpiece and, thereby a possible damage of the workpiece surface, e.g., appearance of scratches on the workpiece surface.

Advantageously, preload is effected with a coil spring supported on the lock member between the displacement member and the driving gear or a component fixedly secured to the driving gear. In this way, the lock member additionally serves as a guide for the preloading spring, which permits to eliminate additional elements.

According to a particular advantageous embodiment of the present invention, at least one clamping member has in its region, which abuts the stem of the fastening element, a clamping jaw. Between the clamping jaw and the guide recess, the clamping member has a resilient region in form, e.g., of an integrated leaf spring. The resilient region provides for an automatic adaptation of the clamping arm to a respective stem diameter upon displacement of the holding device to the support position. This permits to avoid a manual adjustment of the locking device. It is also possible to so form the resilient region that it, in connection with a straight section, provides for additional locking function or takes over the locking function. In this case, the locking device can be dispensed with.

It is advantageous when the clamping jaw is releasably connected with the clamping member. In this case, it is possible to replace a clamping jaw, which shows signs of wear, with another one, without replacing the entire clamping member. This also permits to use clamping jaws having different shapes, e.g., having circular or wedge-shaped recesses of different sizes, or formed of materials having different frictional characteristics.

Advantageously, the clamping jaw is provided with a wedge-shaped recess. With a clamping jaw having a wedge-shaped, e.g., prismatic recess, it is insured that the clamping element contacts the stem of the to-be-driven-in fastening element along two contact lines, independently of the stem diameter. This insures a reliable guidance of the stem by the clamping members.

Advantageously, the inventive holding device is used with a screw-driving tool the tool bit of which is provided with a clamping device. The clamping device provides for a frictional connection between the tool bit and the head of the fastening element. This permits, e.g., to insert the to-be-driven screw in the tool bit with its head. This fastening element will thereby be automatically held in the tool bit, freeing both hand of the screw-driving tool operator. This permits the operator to displace the clamping members from their release position to their support position with one hand while holding the screw-driving tool with the other hand.

The novel features of the present invention, which are considered as characteristic for the invention, are set forth in the appended claims. The invention itself, however both as its construction and its mode of operation, together with additional advantages and objects thereof, will be best understood from the following detailed description of preferred embodiments, when read with reference to the accompanying drawings.

BRIEF DESCRIPTION OF THE DRAWINGS:

The drawings show:

FIG. 4. a perspective partial view of the power tool, together with the holding device, in the support position of the holding device;

FIG. 5. a cross-sectional view of a locking device in the support position of the holding device;

FIG. 6. a cross-sectional view of the locking device shown in FIG. 5 in the release position of the holding device; and FIG. 7. a front elevational view of the driving gear with a holding device according to another embodiment with partially withdrawn support member and rolls in the support position of the holding device.

DETAILED DESCRIPTION OF THE PREFERRED EMBODIMENTS

Figure 1:
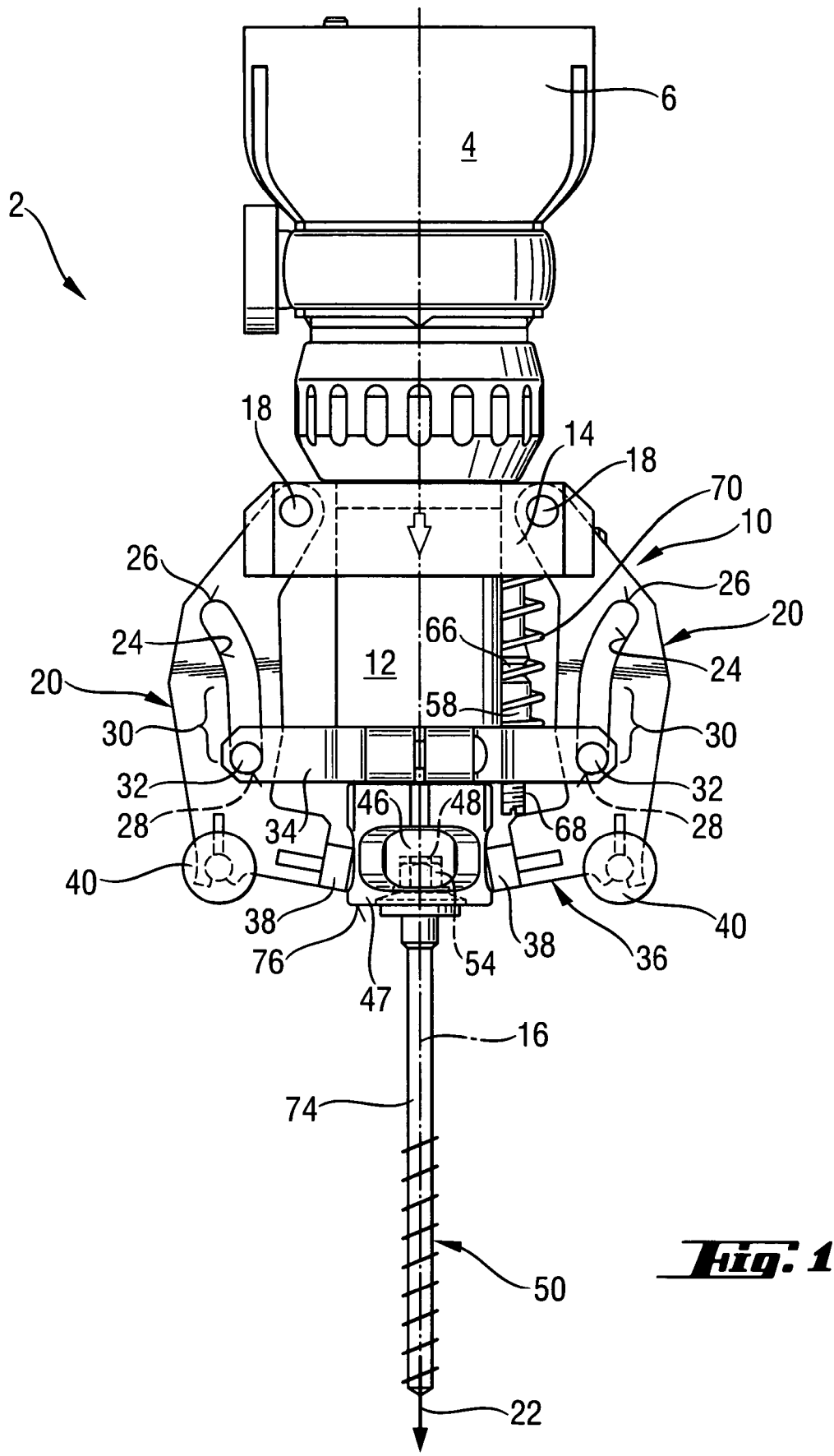
FIG. 1. a front elevational view of a driving gear of a screw-driving power tool with a holding device according to the present invention mounted on the power tool in a release position of the holding device.

FIGS. 1 through 4 show a front portion of a screw-driving power tool 2, together with a driving gear 4 mounted in a driving gear housing 6. The driving gear 4 has a pin-on end 8 (see FIG. 3) on which a holding device 10 is mounted with aid of a support sleeve 12. On the support sleeve 12, a displacement member 14 is supported for displacement along a drive-in axis 16. The displacement member 14 is provided with two pivot supports 18, with each pivot support 18 supporting a clamping member 20 formed as a clamping arm. The clamping member 20 is supported for a pivotal movement relative to the displacement member 14 and relative to the driving gear 4 at its end facing in a direction opposite the drive-in direction 22.

Each clamping member 20 is provided with a guide recess 24 in form of an arcuate opening which is strongly curved toward one end 26. The guide recess 24 has a straight section toward the opposite end 28. A guide member 32 in form of a pin protrudes into the guide recess 24 of each clamping member 20. Both guide members 32 are arranged on a common support member 34 fixedly secured at a front, in the drive-in direction, end of the support sleeve 12. The two guide recesses 24 form with their respective guide member 32 respective slotted crank guides.

At their ends remote from the pivot supports 18, both clamping members 20 have a jaw-receiving recess in which a clamping jaw 38 is releasably secured. In addition to the clamping jaw 38, each of the clamping members 20, has a roll 40 arranged at the extension of the straight section 30 of a respective guide recess 24 and pivotally supported on the clamping member 20.

Figure 3:
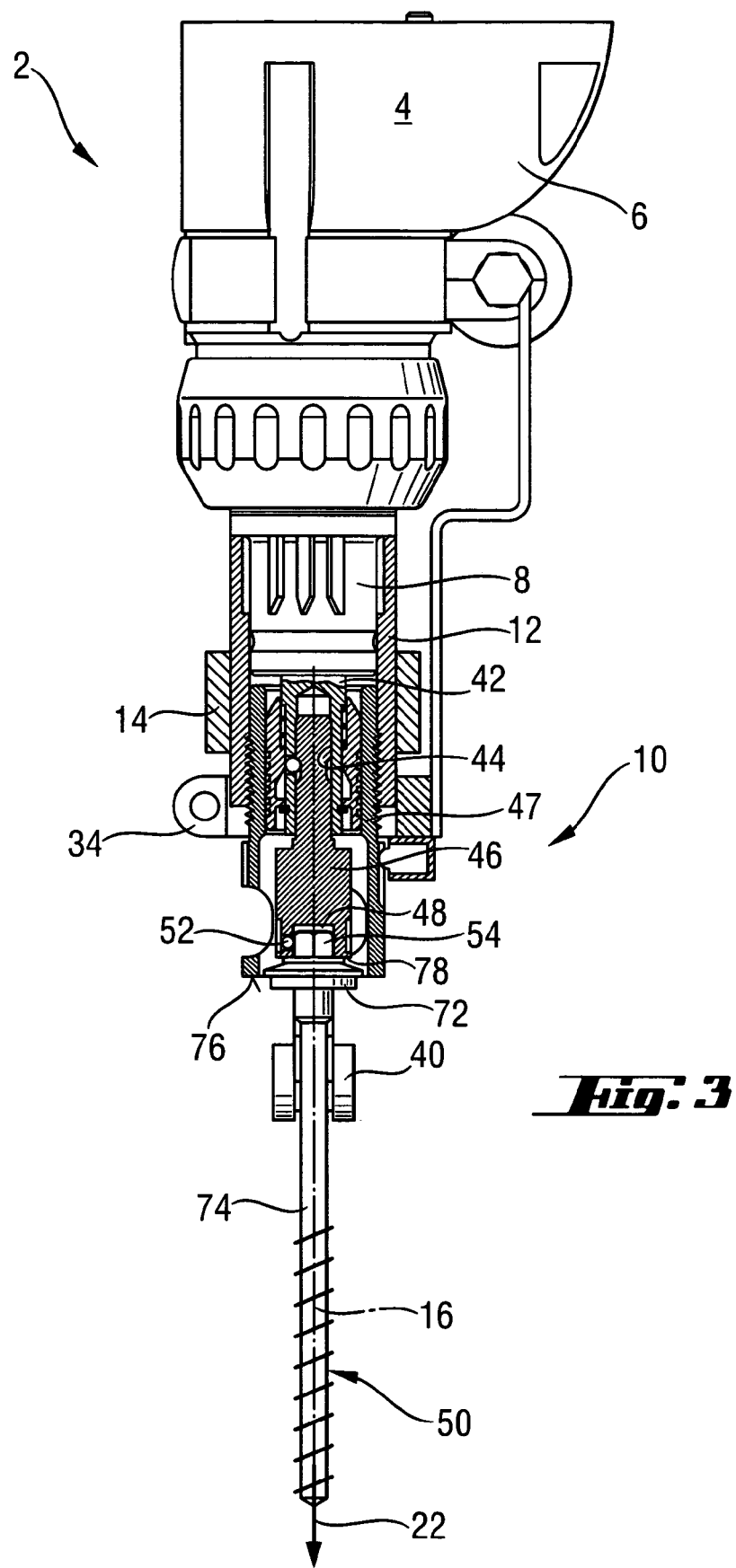
FIG. 3. a cross-sectional view along line III—III in FIG. 2.
Figure 1:
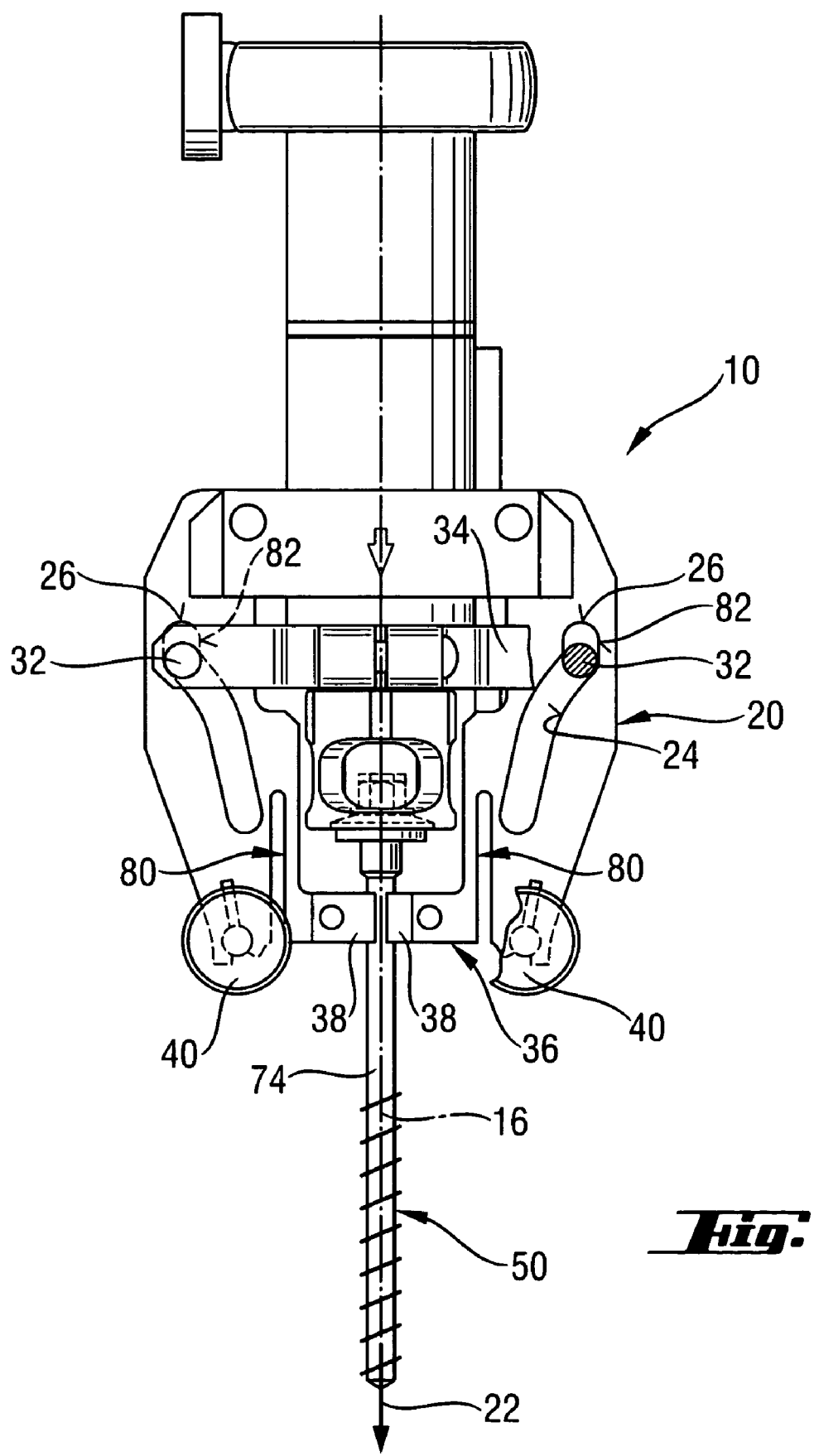

As shown in FIG. 3, a spindle end 42 of the spindle of the power tool 2 extends from the pin-on end 8 of the driving gear 4 into the support sleeve 12, projecting beyond the support sleeve 12. The spindle end 42 has a bit recess 44 in which a tool bit 46 is received. Further, a depth stop 47 is screwed in the support sleeve 12. If needed, the depth stop can be removed.

The tool bit 46 has a hexagonal recess 48 facing in the drive-in direction 22 in which a fastening element 50 in form of a screw is received. In order to provide an automatic retention of the fastening element 50 in the tool bit 46, a spring-biased ball 52 is provided in the tool bit 46. The ball 52 is located in a side opening formed in a wall of the hexagonal recess 48. The ball 52 applies pressured to a hexagonal head 54 of the fastening element 50 which is located in the hexagonal recess 48 in the inserted condition of the fastening element 50. In this way, the ball 52 secures the fastening element 50 on the tool bit 46.

FIGS. 5–6 show a detailed view of a locking device 56 having a lock member 58 in form of a pin secured to the support member 34. The lock member 58 projects through a guide bore 60 provided in the displacement member 14. Transverse to the guide bore 60, there is provided a receiving bore 62 that opens into the guide bore 60. A locking member 64 is located in the receiving bore 62 and is spring-biased by a schematically shown, spring force F.

FIG. 5 shows the locking device 56 in a locking position that corresponds to the support position of the clamping members 20. The locking member 64 projects into a recess 66 formed as a circumferential groove on the lock member 58. The locking device 56 retains the displacement member 14 at a predetermined distance from the support member 34. As shown in FIG. 5, the lock member 58 is provided, at its end adjacent to the support member 34, with an adjustment screw 68. The adjustment screw 68 permits to change the distance between the displacement member 14 and the support member 34 in the locking position.

A coil spring 70 is supported on the lock member 58. The coil spring 70 biases the displacement member 14 and the support member 34 away from each other. In its unloaded condition, the coil spring 70 displaces the displacement member 14 and the support member 34 away from each, providing for a release position of the holding device 10 in which the clamping members 20 are open. In the release position of the holding device 10, the fastening element 50 can be inserted with its hexagonal head 54 without any hindrance into the front end of the power tool 2 and into the tool bit 46. The spring-biased ball 52 prevents an inadvertent falling out of the fastening element 50 from the tool bit 46.

Figure 2:
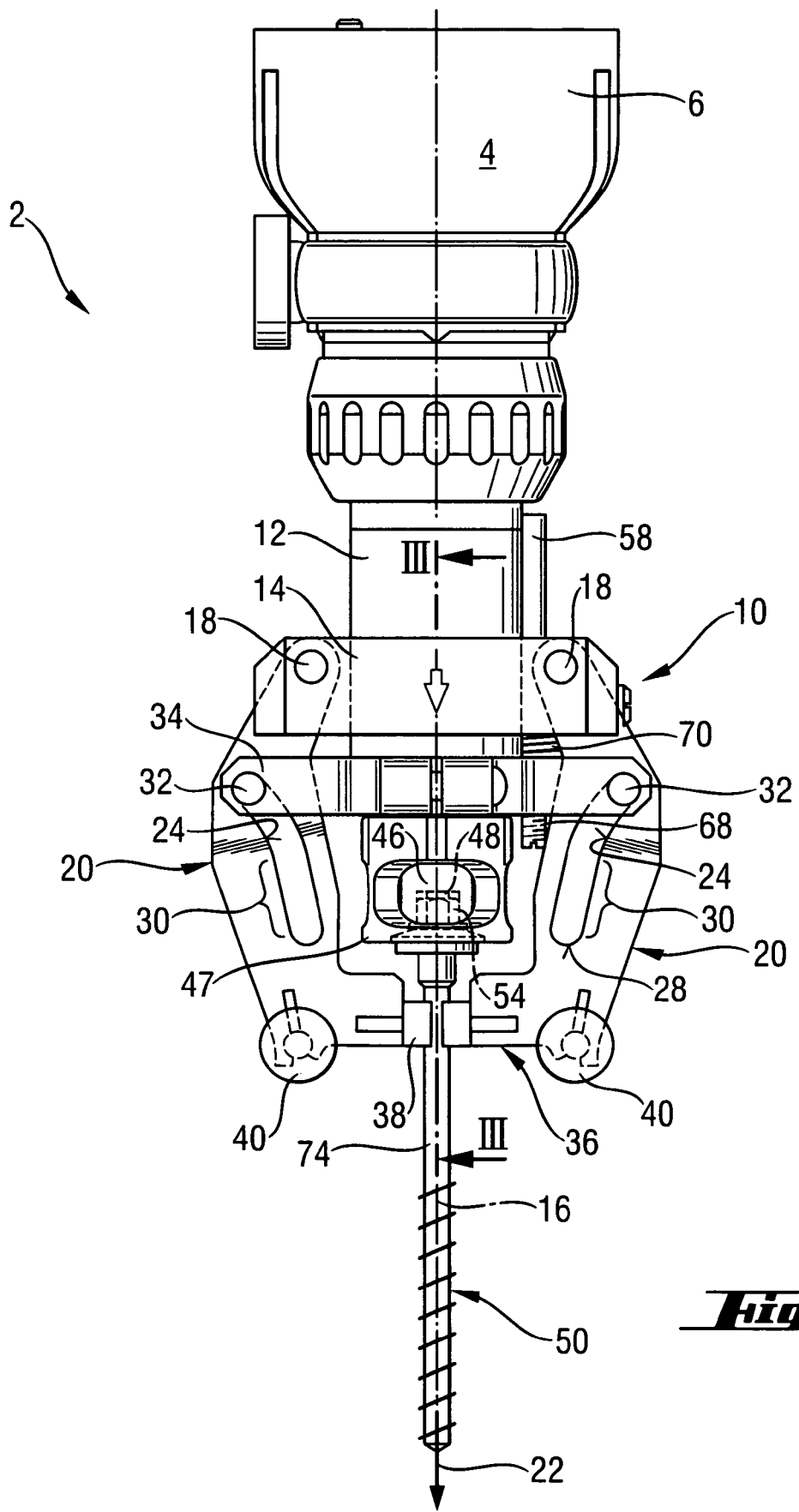
FIG. 2. a view similar to that of FIG. 1 but in a support position of the holding device.

The operator has both his/her hands free and is able to held the power tool 2 with one hand and with the other hand to displace the displacement member 14 against the biasing force of the coil spring 70 toward the support member 34 until the second locking member 64 is engaged in the groove 66, as shown in FIG. 5. In this position of the locking device 56, the holding device 10 occupies a support position, which is shown in FIGS. 2 and 4 and in which the coil spring 70 is loaded. In the release position of the holding device 10, the clamping jaws 38 of the clamping members 20 lie beneath the hexagonal head 54 and a sealing washer 72 provided on the stem 74 of the fastening element 50. As shown in FIG. 4, the clamping jaws 38 have a shape of a prism that is provided with a triangular recess 39, with the stem 74 of the fastening element 50 being engaged along two lines in each of the recesses.

In order to insure, on one hand, a good radial support of the stem 74 and, on the other hand, to prevent an unnecessary large friction, which may be caused by press-on forces applied by the clamping jaws 38 of the clamping members 20, the distance between the clamping jaws 38 can be precisely adjusted, in the support position, with the adjustment screw 68 of the locking device 56. With the adjustment screw 68, the distance between the displacement member 14 and the support member 34 and, thereby, the position of the guide members 32 in the guide recesses 24, which determines the distance between the clamping jaws 38, can be easily adjusted in the support position. The distance between the clamping jaws 38 determines a guide region for the stem 74 in the release position. This distance is usually so selected that clamping jaws contact-the stem 74, in the support position, without any clearance.

Due to a releasable mounting of the clamping jaws 38 in clamping jaw-receiving recesses 36, it is possible to use clamping jaws having different shapes. E.g., instead of clamping jaws 38 with triangular recesses, clamping jaws with circular recesses can be used to provide for a better guidance of the stem 74.

As soon as the clamping members 20 contact the stem 74, the drive-in process can take place. The power tool 2 is actuated, and the fastening element 50 is driven in the drive-in direction 22 and in to a workpiece (not shown). The clamping members 20 support the stem 74 radially, providing for a reliable guidance of a fastening element 50 even when it has a large length. The fastening element 50 can also be driven in without preliminary forming a bore in a workpiece and free of wobling.

As it is particularly shown in FIG. 2, the rolls 40 of the clamping members 20 form, in the drive-in direction 22, a frontmost stop for the assembly screw-driving tool 2—holding device 10. As a result, the rolls 40 are first to contact the workpiece at a corresponding screw-in depth of the fastening element 50.

With pressure being applied to rolls 40 of the clamping members 20, the clamping members 20 are displaced, together with the displacement member 14, relative to the support sleeve 12 and the tool bit 46 backward in a direction opposite the drive-in direction 22. The locking member 64, which is displaced together with the displacement member 14, becomes disengaged from the recess 66 in the lock member 58, whereby the locking device 56 is released. As a result of application of the biasing force of the coil spring 70, the displacement member 14 is displaced, together with the clamping members 20, now automatically, i.e., without any further pressure being applied to rolls 40 in the direction opposite the drive-in direction 22.

With the displacement of the displacement member 14, together with clamping members 20, the strongly curved sections of the guide recesses 24 of the clamping members 20 are displaced along the respective guide members 32. This, together with the axial displacement of the clamping members 20 along the drive-in axis 16, provides for a sharp pivotal movement of the clamping members 20 about their respective pivot supports 18 and, thereby, for an increased radial spacing of the clamping jaws 38 from each other. Upon further displacement of the clamping members 20 relative to the tool bit 46, they are displaced, as a result of the straight sections 30 passing the guide members 32, substantially parallel to the drive-in axis 16, being displaced backward along the shortest path. The distance between the clamping jaws 38 becomes large enough for the clamping jaws 38 to be displaced, in the direction opposite the drive-in direction, over the sealing washer 72 so that they can be located adjacent to the depth stop 47 or the tool bit 46.

As shown in FIG. 1, in this position of the clamping members 20, the rolls 40 of clamping members 20 do not form anymore a frontmost stop in the drive-in direction. Rather the frontmost stop is now defined by an end surface 76 of the depth stop 47. In this way, the fastening element 50 can be driven in a workpiece until the depth stop 47 engages the workpiece.

With a removed depth stop 47, the frontmost stop of the assembly screw-driving power tool 2—holding device 10 is formed by a bit end surface 78 of the tool bit 46 (see FIG. 3). In this case, the fastening element 50 can be driven in until the sealing washer abuts the workpiece.

After the fastening element 50 has been screwed in, the friction between the spring-biased ball 52 and the hexagonal head 54 of the fastening element 50 is overcome by slightly pulling the screw-driving power tool 2 in the direction opposite the drive-in direction 22, whereby the power tool 2 is separated from the fastening element 50. The coil spring 70 retains the holding device 10 in its release position shown in FIG. 1.

In order to execute a new drive-in process, a new fastening element 50 can be inserted with its hexagonal head 54 into the tool bit 46 from the front, in the drive-in direction, side of the screw-driving power tool 2. With the displacement of the displacement member 14 in the drive-in direction 22, the clamping jaws 38 would again engage the stem 74 of the new fastening element 50 for guiding the same, in the manner described above.

FIG. 7 shows an alternative embodiment of a holding device 10 according to the present invention. In the embodiment of the holding device 10 shown in FIG. 7, the clamping members 20 have a resilient region 80 that separates the clamping jaw 38 and the jaw-receiving region 36 from the remaining portion of the clamping member 20 in which the guide recess 24 is formed. The resilient region 80 is formed so that it is resiliently displaceable in a radial direction with respect to the drive-in axis 16. The resilient region 80 is formed as a leaf spring integral with the clamping member 20 which is formed as an injection-molded part. In the embodiment of the holding device 10 shown in FIG. 7, the guide recess 24 has, at its first end 26, an end section 82 that extends away from the curved region of the guide recess 24 by a distance corresponding to the diameter of the stem 74 of a fastening element 50, and extends somewhat parallel to the drive-in axis 16.

For a better clarity, the rolls 40 and the support member 34 are shown only partially. When the clamping jaws 38 abut the stem 74 of the fastening element 50, the guide recess 24 engages the guide member 32 at its end region 82. The clamping jaws 38, upon abutting the stem 74, pivot by different amounts with respect to the remaining portion of the clamping member 20, dependent on the diameter of the stem 74. The resiliency of the resilient region 80 limits the holding forces, so that the surface of the stem 74, which can have, e.g., a corrosion-protective layer or coating, is not damaged during the screw-in process.

During the screw-in process, the resilient clamping jaws 38 compensate the radial run-out of the stem 74 resulting from eccentricities which can be present, e.g., at the tip of a fastening element or along the stem 74. The location of the guide member 32 in the axially aligned end region 82 insures that the clamping members 20 would not be inadvertently released. In this way, a reliable guidance of the fastening element 50 is insured during the entire screw-in process.

Alternatively to the disclosed embodiments, according to the invention, the coil spring 70 can be eliminated. The advantage of the elimination of the coil spring 70 consists in that the clamping members 20 can be displaced more easily from their release position to their support position. The displacement of the clamping members 20 to their release position does not take place automatically any more, but rather by pressing the rollers 40 against the workpiece during the screw-in process. As a result, the rolls 40 remain in a loose contact with the workpiece during the entire screw-in process.

Further, alternatively to the use of the locking device 56 with the coil spring 70, there can be provided a biasing force acting against the coil spring 70. As a result, the clamping members 20 occupy a support position in an unloaded condition. The applied biasing force should be overcome during the screw-in process in order to open the clamping jaws 38.

Though the present invention was shown and described with references to the preferred embodiments, such are merely illustrative of the present invention and are not to be construed as a limitation thereof and various modifications of the present invention will be apparent to those skilled in the art. It is therefore not intended that the present invention be limited to the disclosed embodiments or details thereof, and the present invention includes all variations and/or alternative embodiments within the spirit and scope of the present invention as defined by the appended claims.

What is claimed is:

1. A device (10) securable on a screw-driving power tool (2) for holding and supporting a fastening element (50) insertable in a tool bit (46) of the power tool (2), the holding device (10) comprising at least two clamping members (20) which abut a stem (74) of the fastening element (50) in a support position of the clamping members and which are displaceable, upon application of a force thereto in a direction opposite a drive-in direction of the power tool, from the support position thereof into a release position thereof in which the at least two clamping members (20) release the stem (74), the clamping members (20) each formed by a clamping arm having a first end supported by a pivot support (18) displaceable relative to a driving gear (4) of the power tool (2) and by a slotted crank guide, each said clamping arm including an opposing second end having at least one contact region (40) which forms, at least in the support position of the clamping members (20), a frontmost stop of the holding device (10) in the drive-in direction (22) of the power tool (2) for engaging a workpiece the fastening element (50) is being driven into, whereby the workpiece applies to the clamping members (20) the force in the direction opposite the drive-in direction.

2. A holding device according to claim 1, wherein the contact region is formed by at least one roll (40).

3. A holding device according to claim 2, wherein the at least one roll (40) has a spherical shape.

4. A holding device according to claim 1, wherein the slotted crank guide has at least one curved guide recess (24) provided in the clamping member (20), and a guide member (32) projecting into the curved guide recess (24) and connected with the drive gear (4) without a possibility of displacement relative thereto.

5. A holding device according to claim 4, wherein the curved guide recess (24) has toward a first end (26) thereof, in which the guide member (32) is arranged in the support position of the clamping members (20), a strongly curved section.

6. A holding device according to claim 5, wherein the first end (26) is formed by a straight end section (82) that extends substantially parallel to a drive-in direction (22) of the power tool (2) in the support position of the clamping members (20).

7. A holding device according to claim 5, wherein the curved guide recess (24) has toward the second end (28) thereof, in which the guide member (32) is arranged in the release position of the clamping members (20), a straight section (30).

8. A holding device according to claim 7, wherein the at least one contact region is arranged in a longitudinal direction of the straight section (30).

9. A holding device according to claim 1, further comprising a locking device (56) for locking the clamping members (20) in the support position thereof and releasable upon application of a force to the contact region.

10. A holding device according to claim 9, wherein the locking device (56) comprises means for adjusting a locking position thereof.

11. A holding device according to claim 10, wherein the locking device (56) comprises a lock member (58) securable in different positions relative to the guiding gear (4) of the power tool, the holding device further comprising a displacement member (14) for supporting displaceable pivot supports (18) of the clamping members (20) and displaceable along the lock member (58), the locking device further comprising a locking member (64) displaceably arranged in the displacement member (14) and engageable in a recess (66) formed in the lock member, the locking member (64) being preloaded against the lock member (58) for locking the clamping members (20) in the support position thereof.

12. A holding device according to claim 11, comprising means for preloading the clamping members (20) in the release position thereof.

13. A holding device according to claim 12, wherein the preloading means comprises a coil spring (70) supported on the lock member (58) and supported, at opposite ends thereof, against the displacement member (14) and a driving gear (4) of the power tool (2), respectively.

14. A holding device according to claim 1, wherein at least one clamping member (20) has in a region thereof, which abuts the stem (74) of the fastening element (50), a clamping jaw (38), a guide recess (24), and a resilient region (80) located between the clamping jaw (38) and the guide recess (24).

15. A holding device according to claim 14, wherein the clamping jaw (38) is releasably connected with the at least one clamping member (20).

16. A holding device according to claim 15, wherein the clamping jaw (38) has a wedge-shaped recess (39).

17. A holding device according to claim 1, wherein the tool bit (46) has clamping means frictionally engaging a head (54) of the fastening element (50) with which the fastening element is inserted in the tool bit (46).

* * * * *